United States Patent
Zha et al.

(10) Patent No.: US 11,746,281 B2
(45) Date of Patent: Sep. 5, 2023

(54) CROSSLINKED PROPPANT-GEL MATRIX

(71) Applicant: Hexion Inc., Columbus, OH (US)

(72) Inventors: Charles Zha, Stafford, TX (US); Jan Beetge, Stafford, TX (US)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 17/864,076

(22) Filed: Jul. 13, 2022

(65) Prior Publication Data

US 2022/0348820 A1     Nov. 3, 2022

Related U.S. Application Data

(60) Division of application No. 17/118,834, filed on Dec. 11, 2020, now Pat. No. 11,447,689, which is a continuation of application No. 15/612,560, filed on Jun. 2, 2017, now Pat. No. 10,883,041.

(51) Int. Cl.

| | | |
|---|---|---|
| C09K 8/68 | (2006.01) | |
| C09K 8/575 | (2006.01) | |
| C09K 8/80 | (2006.01) | |
| C09K 8/90 | (2006.01) | |
| C08B 15/00 | (2006.01) | |
| C08B 11/02 | (2006.01) | |
| C08B 37/00 | (2006.01) | |
| C08K 5/00 | (2006.01) | |
| C01F 11/02 | (2006.01) | |
| C08K 3/011 | (2018.01) | |
| C01B 25/30 | (2006.01) | |
| C01B 11/00 | (2006.01) | |

(52) U.S. Cl.
CPC ............... *C09K 8/68* (2013.01); *C01F 11/02* (2013.01); *C08B 11/02* (2013.01); *C08B 15/005* (2013.01); *C08B 37/00* (2013.01); *C08B 37/0096* (2013.01); *C08K 3/011* (2018.01); *C08K 5/0025* (2013.01); *C09K 8/5755* (2013.01); *C09K 8/685* (2013.01); *C09K 8/80* (2013.01); *C09K 8/805* (2013.01); *C09K 8/90* (2013.01); *C01B 11/00* (2013.01); *C01B 25/30* (2013.01)

(58) Field of Classification Search
CPC .......... C09K 8/80; C09K 8/805; C09K 8/685; C09K 8/90; Y10S 507/924
See application file for complete search history.

(56) References Cited

U.S. PATENT DOCUMENTS

2015/0013983 A1*   1/2015   Alwattari ............... C09K 8/725
                                                  507/224

\* cited by examiner

*Primary Examiner* — Aiqun Li

(57) ABSTRACT

A method of making a proppant-gel matrix comprising: a) hydrating a gelling agent to form a hydrated gelling agent; b) adding a basic compound to the hydrated gelling agent to form a basic hydrated gelling agent having a pH in the range of 11.5 to 14.0; c) mixing the basic hydrated gelling agent and a proppant to form a basic hydrated gelling system; and d) adding a crosslinking agent to the basic hydrated gelling system to form the proppant-gel matrix, is disclosed. The proppant-gel matrix can then be used as a fracturing fluid in a hydraulic fracturing process.

19 Claims, 3 Drawing Sheets

11,746,281 B2

CROSSLINKED PROPPANT-GEL MATRIX

RELATED APPLICATION DATA

This application is a divisional application of co-pending U.S. application Ser. No. 17/118,834 with a filing date of Dec. 11, 2020, which application claims benefit to and is a continuation application of co-pending U.S. application Ser. No. 15/612,560, with a filing date of Jun. 2, 2017, issued as U.S. Pat. No. 10,883,041 on Jan. 5, 2021, the entire contents of these applications are incorporated by reference herein.

FIELD OF THE INVENTION

This invention relates to hydraulic fracturing processes. More particularly, this invention relates to fracturing fluids useful in hydraulic fracturing processes.

BACKGROUND OF THE INVENTION

In a hydraulic fracturing ('fracking') operation in an oilfield, high pressure fluid is pumped to the downhole formation to create fractures. After the pressure is released, the newly created fractures will be closed due to formation pressure. To prevent the closure, proppants are pumped into the downhole formation which hold the newly created fractures. Generally, a gelling agent such as guar gum is used as a carrier to transport the proppants. In this operation, proppants such as sands, coated sands, and ceramics are blended with the guar gum, and the suspension is pumped into the downhole formation. The carrier is then degraded and the proppants remain.

Proppant loading is an important factor in determining the cost of a hydraulic fracturing operation. For a given well, the required proppant amount is a fixed number, which is determined by the volume of fractures generated by the fracturing operation. The more proppants that can be loaded per pound of gelling agent, the less gelling agent will be needed, and the cheaper the operation will be. In addition to the cost of the gelling agent, less energy will be used if less pump time is needed, which saves money on equipment consumption, thereby also reducing the operation cost. However, the proppant loading per pound of gelling agent is limited by the inherent density of the proppants. The proppants are physically suspended in the gelling agent, and the settling occurs instantly after the agitation is stopped. Increasing proppant loading will result in more settling. Proppants settled in a wellbore can clog the wellbore, which is highly undesirable. Quick settling also makes it difficult to transport proppants to the locations that are near the far end of the cracks, which has been believed to be critical to the production rate, Increasing gel viscosity can increase proppant loading, but increased gel viscosity is associated with increased gelling agent loading. Also, increasing gel viscosity will increase pump loading, thereby shortening pump life, and thus is not an effective method.

Therefore, a more efficient system that can transport more proppants with lower raw material, energy, and operational costs would be desirable.

SUMMARY OF THE INVENTION

In one broad embodiment of the present invention, there is disclosed a method of making a proppant-gel matrix comprising, consisting of, or consisting essentially of: a) hydrating a gelling agent to form a hydrated gelling agent; b) adding a basic compound to the hydrated gelling agent to form a basic hydrated gelling agent having a pH in the range of 11.5 to 14.0; c) mixing the basic hydrated gelling agent and a proppant to form a basic hydrated gelling system; and d) adding a crosslinking agent to the basic hydrated gelling system to form the proppant-gel matrix.

Also disclosed in the present invention is a method for stimulating hydrocarbon production from a subterranean formation comprising injecting a fracturing fluid comprising the above-mentioned proppant-gel matrix into the subterranean formation.

DETAILED DESCRIPTION OF THE INVENTION

Figure 1:
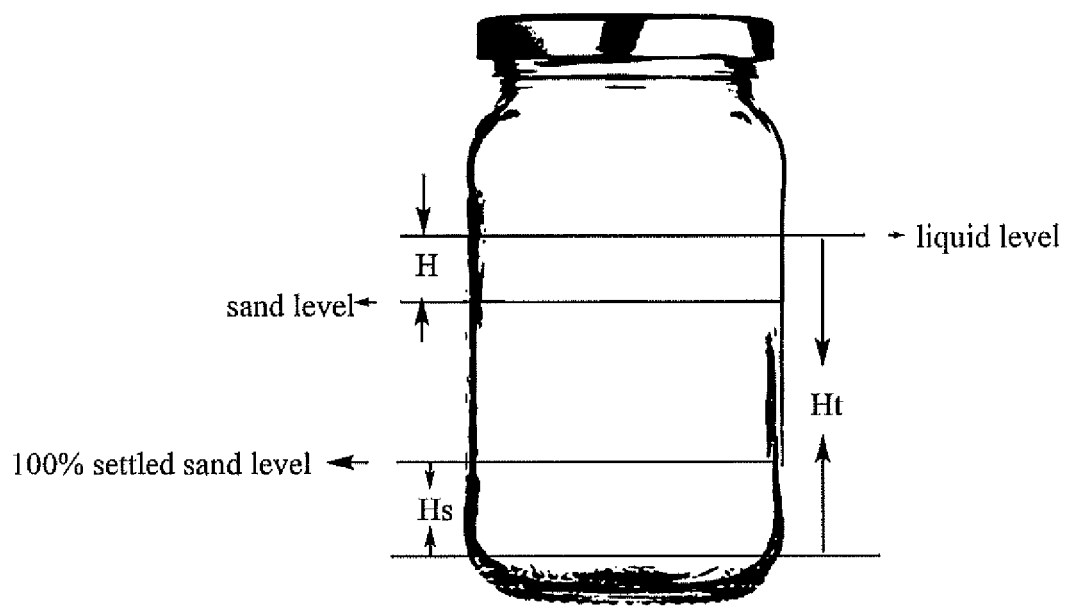
FIG. 1 is a diagram showing variables useful in an equation to calculate the settling rate of samples.
Figure 2:
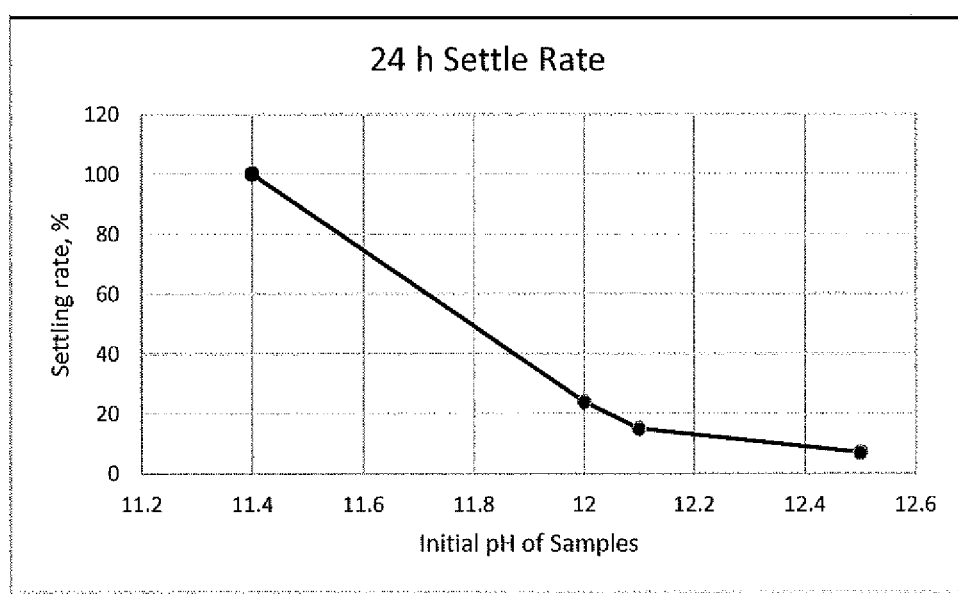
FIG. 2 is a plot of settling rate vs. initial pH of samples over a 24 hour period.
Figure 3:
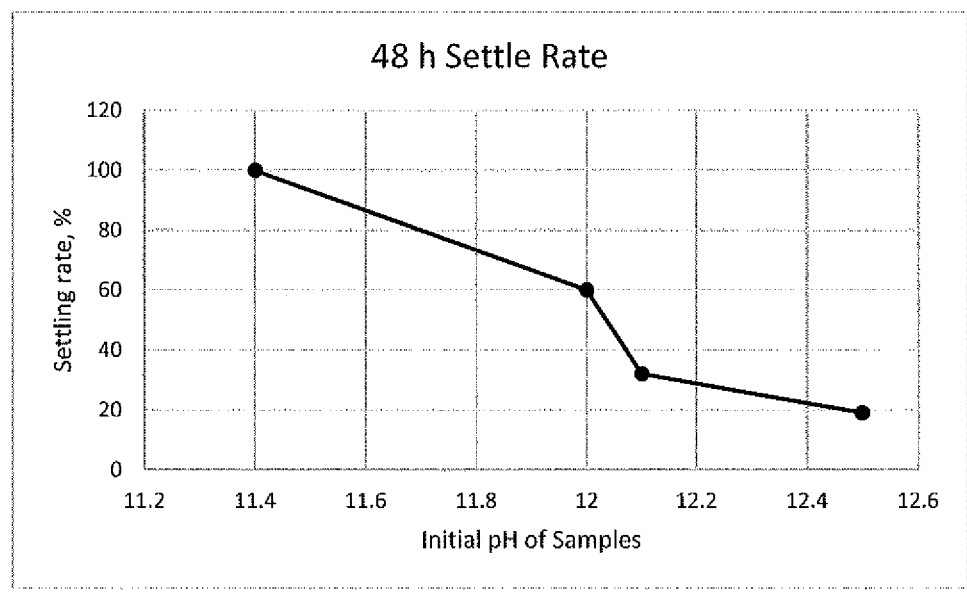
FIG. 3 is a plot of settling rate vs. initial pH of samples over a 48 hour period.
Figure 4:
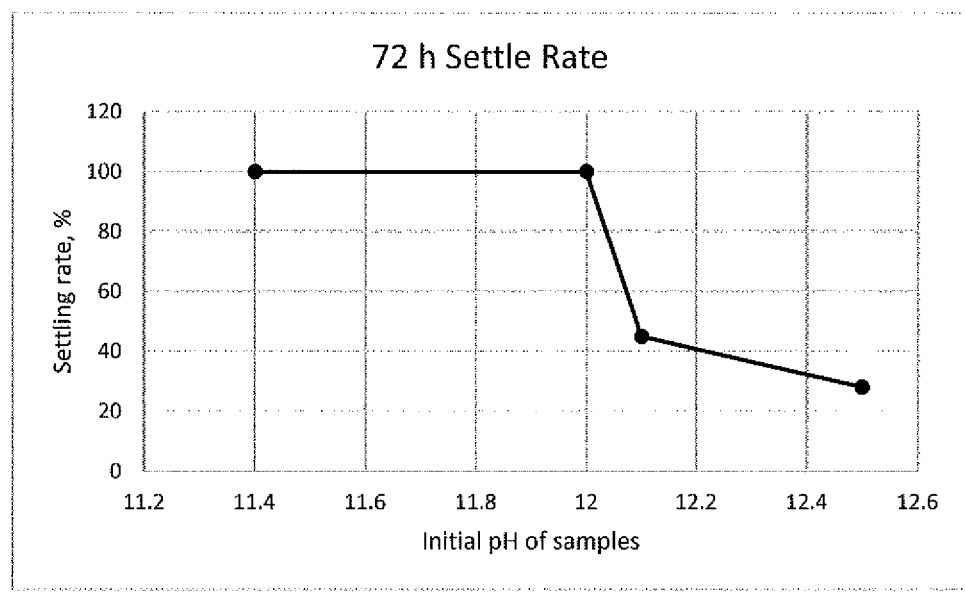
FIG. 4 is a plot of settling rate vs. initial pH of samples over a 72 hour period.
Figure 5:
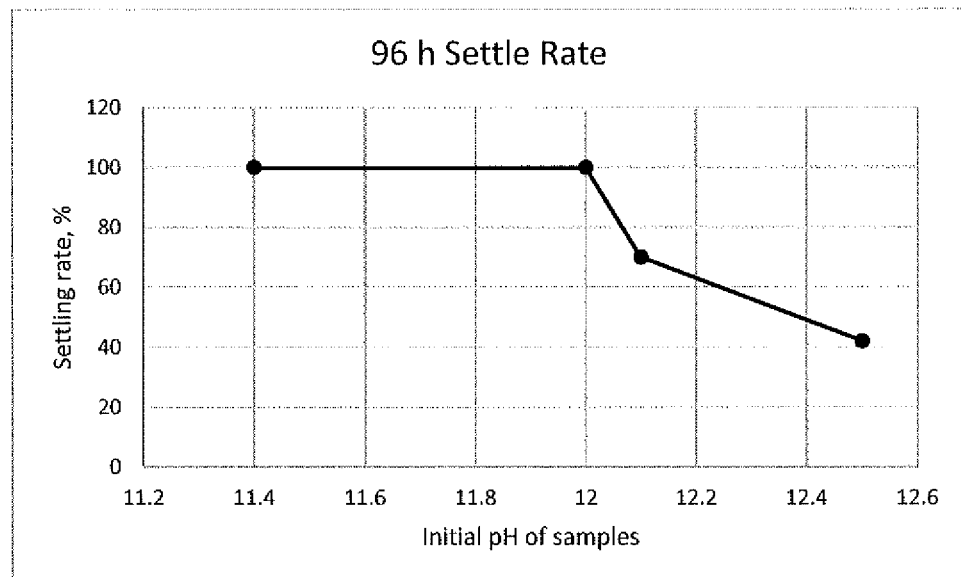
FIG. 5 is a plot of settling rate vs. initial pH of samples over a 96 hour period.

In one broad embodiment of the invention, there is disclosed a method of making a proppant-gel matrix comprising: a) hydrating a gelling agent to form a hydrated gelling agent; b) adding a basic compound to the hydrated gelling agent to form a basic hydrated gelling agent having a pH in the range of 11.5 to 14.0, c) mixing the basic hydrated gelling agent and a proppant to form a basic hydrated gelling system; and d) adding a crosslinking agent to the basic hydrated gelling system to form the proppant-gel matrix.

Generally, the gelling agent may be present in the proppant-gel matrix an amount in the range of from 0.01 weight percent to about 5 weight percent, and the crosslinking agent can be present in the proppant-gel matrix in an amount in the range of from 0.003 weight percent to 5 weight percent, based on the total weight of aqueous fluid in the proppant-gel matrix, with the proviso that the weight percents of all components in the aqueous fluid add up to 100 weight percent. The proppant can generally be present in the proppant-gel matrix in the range of from 2 weight percent to 60 weight percent based on the total weight of the proppant-gel matrix, with the proviso that the weight percents of all components in the proppant-gel matrix add up to 100 weight percent.

Examples of gelling agents that can be used include, but are not limited to guar gum, modified guar gum such as hydroxypropyl guar, hydroxyethyl guar, carboxymethyl guar, carboxymethyl hydroxypropyl guar, carboxymethylhydroxyethyl guar, and cellulose and its derivatives such as hydroxyethyl cellulose, carboxyethylcellulose, carboxymethylcellulose, carboxymethylhydroxyethylcellulose, and other natural gums such as natural gums obtained from seaweeds such as, for example, agar, alginic acid, sodium alginate, and carrageenan. Natural gums obtained from non-marine botanical resources can also be used. Examples of these include, but are not limited to gum arabic, from the sap of *Acacia* trees, gum ghatti, from the sap of *Anogeissus* trees, gum tragacanth, from the sap of *Astragalus* shrubs, karaya gum, from the sap of *Sterculia* trees, locust bean gum, from the seeds of the carob tree, beta-glucan, from oat or barley bran, chicle gum, obtained from chick trees, dammar gum, from the sap of Dipterocarpaceae trees, glucomannan, from the konjac plant, mastic gum, obtained from the mastic tree, psyllium seed husks, from the *Plantago* plant, spruce gum, obtained from spruce trees, and tara gum, from the seeds of the tara tree. Natural gums produced by bacterial fermentation such as gellan gum, and xanthan gum can also be used. Gelling agents can also include any other natural or synthetic oligomeric or polymeric thickeners that contain a cis-diol structure in the molecule. Combinations of any of the above-mentioned gelling agents can also be used.

The gelling agent can be present in the proppant-gel matrix of the present invention in an amount sufficient to provide the desired viscosity and strength to hold and deliver the proppants to the desired destinations. Generally, the gelling agent may be present in an amount in the range of from 0.01 weight percent to about 5 weight percent, based on the total weight of the aqueous fluid of the proppant-gel matrix. In various other embodiments, the gelling agent is present in an amount in the range of from 0.01 weight percent to 2 weight percent, based on the total weight of the aqueous fluid in the proppant-gel matrix.

Generally, the desired degree of hydration for the gelling agent is from 5 percent to 100 percent. Any and all ranges between 5 and 100 percent are included herein and disclosed herein, for example, the gelling agent can be hydrated to a degree of from 10 percent to 85 percent, 20 percent to 60 percent, 30 percent to 60 percent, or 40 percent to 60 percent.

After the desired degree of hydration is achieved, a basic compound can be added to the hydrated gelling agent to form a basic hydrated gelling agent having a pH in the range of from 11.5 to 14.0. Any and all pH ranges between 11.5 and 14.0 are included herein and disclosed herein; for example, the basic hydrated gelling agent can have a pH in the range of from 12.0 to 14.0, from 12.2 to 13.5, from 12.0 to 13.0, from 12.3 to 13.0, from 12.0 to 12.8, from 12.3 to 12.8, from 12.2 to 12.9, from 12.2 to 12.8, from 12.3 to 12.9, from 12.3 to 13.0, from 12.4 to 12.8, or from 12.4 to 12.6.

A basic compound is any compound which produces hydroxide ions in water solutions. Examples of basic compounds that can be useful at this stage include, but are not limited to bases such as sodium hydroxide, potassium hydroxide, lithium hydroxide, cesium hydroxide, rubidium hydroxide, ammonium hydroxide, magnesium hydroxide, calcium hydroxide, barium hydroxide, sodium carbonate, sodium bicarbonate, potassium carbonate, potassium bicarbonate, rubidium carbonate, rubidium bicarbonate, cesium carbonate, cesium bicarbonate, potassium phosphate, sodium phosphate, cesium phosphate, lithium phosphate, and combinations of any two or more thereof.

The basic hydrated gelling agent can then be mixed with a proppant to form a basic hydrated gelling system.

Proppants useful in this invention include, but are not limited to raw sand (such as brown sand or white sand), sand coated with various coatings such as phenolic coatings, polyurethane coatings, polyamide coatings, polyester coatings, epoxy coatings, any other useful polymer coatings, small molecule coating additives with molecular mass below 1,000 grams/mole such as SandWedge® and Expedite®, both available from Halliburton, ceramic proppants, ceramic proppants coated with resin coatings, polymer coatings, or small molecule coating additives, and proppants made of any other useful inorganic raw materials. Mixtures of any of the aforementioned proppants can also be used.

The proppants can have a grain size from 3 mesh to 500 mesh. Any and all ranges within the range of 3 mesh to 500 mesh are included herein and disclosed herein; for example, the proppants can have a grain size of from 3 mesh to 400 mesh, from 10 mesh to 400 mesh, from 15 mesh to 300 mesh or from 20 mesh to 200 mesh.

Generally, the proppant is present in the proppant-gel matrix in the range of from 2 weight percent to 60 weight percent, based on the total weight of the proppant-gel matrix. Any and all ranges within the range of 2 weight percent to 60 weight percent are included herein and disclosed herein; for example, the proppant can be present in the proppant-gel matrix in the range of from 5 weight percent to 50 weight percent, or from 15 weight percent to 45 weight percent.

In various embodiments, above-mentioned steps b) and c) can be performed in reverse, ie. the proppant can be added to the hydrated gelling agent before the basic compound is added to the system.

A crosslinking agent is then added to the basic hydrated gelling system to faun a proppant-gel matrix.

Examples of crosslinking agents include, but are not limited to borates such as borax (sodium borate) and boric acid, other boron compounds such as probertite ($NaCaB_5O_9 \cdot 5H_2O$), ulexite ($BaCaB_5O_9 \cdot 8H_2O$), nobleite ($CaB_6O10 \cdot 4H_2O$), gowerite ($CaB_6O_{10} \cdot 5H_2O$), frolovite ($Ca_2B_4O_8 \cdot 7H_2O$), colemanite ($Ca_2B_6O_{11} \cdot 5H_2O$), meyerhofferite ($Ca_2B_6O_{11} \cdot 7H_2O$), inyoite ($Ca_2B_6O_{11} \cdot 13H_2O$), priceite ($Ca_4B_{10}O_{19} \cdot 7H_2O$), tertschite ($Ca_4B_{10}O_{19} \cdot 20$), ginorite ($Ca_2B_{14}O_{23} \cdot 8H_2O$), pinnoite ($MgB_2O_4 \cdot 3H_2O$), paternoite ($MgB_8O_{13} \cdot 4H_2O$), kurnakovite ($Mg_2B_6O_{11} \cdot 15H_2O$), inderite ($Mg_2B_6O_{11} \cdot 15H_2O$), preobrazhenskite ($Mg_3B_{10}O_{18} \cdot 4\frac{1}{2}H_2O$), hydroboracite ($CaMgB_6O_{11} \cdot 6H_2O$), inderborite ($CaMgB_6O_{11} \cdot 11H_2O$), kaliborite (Heintzite) ($KMg_2B_{11}O_{19} \cdot 9H_2O$), veatchite ($SrB_6O_{11} \cdot 2H_2O$), trialkoxy boron ester, and any other boron compound that can generate borate, or boric acid at a pH range of from 11.5 to 14.0.

Other examples of crosslinking agents include, but are not limited to, titanium alkanol amine complexes, titanium diethanolamine complexes, titanium triethanolamine complexes, titanium lactate, titanium ethylene glycolate, titanium acetyleacetonate, titanium ammonium lactate, titanium diethanolamine lactate, titanium triethanolamine lactate, titanium diisopropylamine lactate, titanium sodium lactate salts, titanium sorbitol complexes, zirconium triisopropylamine, zirconium lactate, zirconium lactate triethanolamine, zirconium carbonate, zirconium oxide, zirconium acetylacetonate, zirconium malate, zirconium citrate, or a polyhydroxy complex zirconium. Other titanates and zirconates such as those in the Tyzor™ line from Dorf Ketal can also be used. Other examples of crosslinking agents that can be used are chromium, aluminum, and antimony compounds, and any other compounds that can form bis-diol complexes.

Combinations of any of the above-mentioned crosslinking agents can also be used.

The crosslinking agent can be present in the proppant-gel matrix an amount in the range of from 0.003 weight percent to 5 weight percent, based on the total weight of aqueous fluid in the proppant-gel matrix. Any and all ranges between 0.003 weight percent to 5 weight percent are included herein and disclosed herein; for example, the crosslinking agent can be present in the range of from 0.003 weight percent to 2 weight percent or 0.05 weight percent to 1.5 weight percent.

Optionally, the proppant-gel matrix can further contain other additives that are known to be commonly used in hydraulic fracturing operations by those skilled in the art. Examples of these additives include, but are not limited to surfactants, gel breakers, oxygen scavengers, alcohols, scale inhibitors, corrosion inhibitors, fluid-loss additives, $H_2S$ scavengers, and bactericides.

Examples of gel breakers that can be used include, but are not limited to potassium persulfate, sodium peroxydisulfate, ammonium peroxydisulfate, t-butylhydroperoxide, calcium peroxide, magnesium peroxide, sodium chlorite, sodium bromate, and ethylenediaminetetraacetic acid, and combinations of any two or more thereof.

The method of this invention can be employed in standard fracturing treatments, employing techniques and equipment well known in the art.

EXAMPLES

For the following examples, the data was derived in accordance with the following procedures.

The settling rate was calculated using the following equation:

$$\% \text{ settle} = H/(Ht-Hs) \times 100$$

The variables H, Ht, and Hs are measured according to the diagram in FIG. 1.

The viscosity of the bulk fluid was measured with a Brookfield viscometer.

Example 1—Effect of pH on the Stability of the Matrix

General Procedure

To a glass jar with 250 mL of distilled water was added 0.6 grams of guar. The system was agitated manually to disperse the guar. After hydrating for 30 minutes at ambient temperature, the pH of the fluid was adjusted by adding sodium hydroxide solution (50%). 45 grams of proppant (40/70 Unimin white sand) was added to the fluid and the system was briefly mixed. 0.9 grams of borax solution (20% in glycol) was then added to the fluid, and the system was manually agitated for 5 minutes. The settling time was recorded, the level of the proppant was measured and the settling rate was calculated. The settling rate is the quotient of the settled height of the proppant divided by the original height.

The settling rate was measured for 4 samples. The pH values were measured at the beginning of the settling experiment. The pH values of the 4 samples were: 11.4, 12.0, 12.1, and 12.5. The settling percentages of these samples is shown in Table 1, below.

TABLE 1

| | | Effect of pH on Settling Rate of Sand in the Guar Gel Matrix | | | |
|---|---|---|---|---|---|
| sample | pH | % settling at 24 h | % settling at 48 h | % settling at 72 h | % settling at 96 h |
| 1 | 11.4 | 100 | | | |
| 2 | 12.0 | 24 | 60 | 100 | |
| 3 | 12.1 | 15 | 32 | 45 | 70 |
| 4 | 12.5 | 7 | 19 | 28 | 42 |

FIGS. 2, 3, 4, and 5 also show the settling rate for the samples after 24 hours, 48 hours, 72 hours, and 96 hours, respectively. As can be seen from these figures, the pH has a dramatic impact on the settling rate of the proppants.

Figure 6:
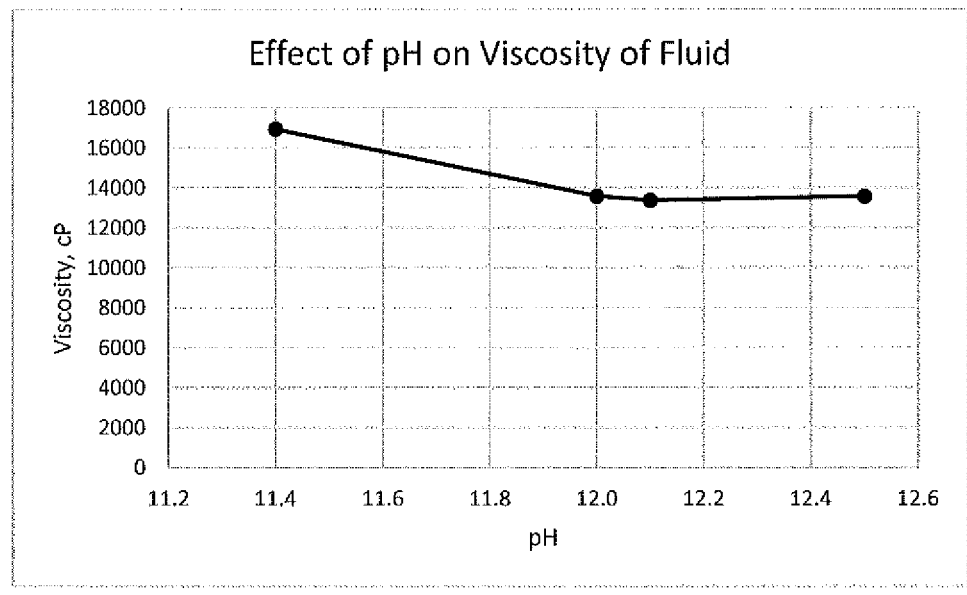
FIG. 6 is a plot of viscosity vs. initial pH of samples.

FIG. 6 is a plot of viscosity vs. pH for the four samples. As can be seen from FIG. 6, the effect of pH on the viscosity of the samples is minor.

Example 2—pH Ranges

General Procedure

To a glass jar with 125 mL deionized water was added 0.3 grams of guar gum. The guar was quickly stirred so as to be distributed in the water without visible particles. The system was allowed to remain at ambient temperature for 30 minutes in order to hydrate. The fluid was then adjusted to a designated pH by adding NaOH solutions (10% for initial adjustment, 0.5% for fine adjustment). 90 grams of sand (40/70 Unimin white sand) and 0.9 grams of borax (20% in ethylene glycol) were then added to the fluid.

This experiment was conducted with samples with pH values of 9.0, 9.5, 10.0, 10.5, 11.0, 11.5, 12.0, 12.5 and 13.0. Table 2 below shows the settling percentages of these samples.

TABLE 2

| | | Effect of pH on Settling Rate of Sand in Guar Gel Matrix | | | | | | | |
|---|---|---|---|---|---|---|---|---|---|
| Sample | pH | % settling at 1 h | % settling at 3 h | % settling at 18 h | % settling at 3 d | % settling at 4 d | % settling at 7 d | % settling at 18 d | % settling at 27 d |
| 1 | 9.0 | 34 | 56 | 100 | | | | | |
| 2 | 9.5 | 34 | 56 | 100 | | | | | |
| 3 | 10.0 | 34 | 56 | 100 | | | | | |
| 4 | 10.5 | 34 | 56 | 100 | | | | | |
| 5 | 11.0 | 34 | 56 | 100 | | | | | |
| 6 | 11.5 | N/A | N/A | N/A | 100 | | | | |
| 7 | 12.0 | N/A | N/A | N/A | 80 | 100 | | | |
| 8 | 12.5 | N/A | N/A | N/A | 20 | 21 | 27 | 34 | 52 |
| 9 | 13.0 | N/A | N/A | N/A | 16 | 25 | 28 | 63 | 72 |

Table 2 shows that with a pH up to 11.0, there is no cross-linking between the sand and the guar since all the samples show the same settling rate.

Example 3—Narrower pH Ranges

General Procedure

To a glass jar with 125 ml deionized water was added 0.3 grams of guar gum. The guar was quickly stirred to be distributed in the water without visible particles. The system was allowed to remain at ambient temperature for 30 minutes in order to hydrate. The fluid was then adjusted to a designated pH by adding NaOH solutions (10% for initial adjustment, 0.5% for fine adjustment). 90 grams of 40/70 Unimin white sand and 0.9 grams of borax solution (20% in ethylene glycol) was added to the fluid, and the fluid was manually mixed for 5 minutes.

This experiment was conducted with samples with pH values of 12.000, 12.117, 12.228, 12.313, 12.408, 12.502, 12.602, 12.699, 12.825, and 12.897. Table 3 shows the settling percentage of the samples at 4 days, 10 days, 20 days, and 30 days, respectively. The data in Table 3 demonstrates that samples having a pH value of 12.408 and 12.502, the matrix was the most stable. After 30 days, these samples settled 25.0% and 22.6% respectively.

TABLE 3

Settling Percentages vs. Time

| sample | pH | % settling at 4 d | % settling at 10 d | % settling at 20 d | % settling at 30 d |
|---|---|---|---|---|---|
| 1 | 12.000 | 100.0 | — | — | — |
| 2 | 12.117 | 27.7 | 100.0 | — | — |
| 3* | 12.228 | 20.9 | n/a | n/a | n/a |
| 4 | 12.313 | 8.2 | 20.7 | 46.9 | 76.7 |
| 5 | 12.408 | 7.3 | 11.7 | 19.0 | 25.0 |
| 6 | 12.502 | 7.0 | 11.0 | 16.0 | 22.6 |
| 7 | 12.602 | 7.0 | 12.1 | 20.0 | 41.3 |
| 8** | 12.699 | 3.4 | 7.3 | 16.0 | 30.3 |
| 9 | 12.825 | 6.0 | 12.1 | 31.7 | 50.1 |
| 10 | 12.897 | 7.0 | 16.4 | 49.4 | 51.7 |

3*: on the 6$^{th}$ day, the sample showed abnormal settling, possibly caused by bacteria contamination.
8**: post-agitation was applied, which indicates agitation profile can change settling rate.

Example 4—Matrix Thermal Stability

In order to test the thermal stability of the guar-boron-silica matrix, three samples with different pH values were prepared according to the procedure in Example 2. After the samples were aged for 10 minutes, they were then placed in a water bath at 60° C. The samples were removed from the bath every 10 minutes for photography. As shown in Table 4, sample 3 showed about 10 times more stability compared to sample 1.

TABLE 4

Settling Time vs. pH at 60° C.

| Sample | pH | 100% settle time, min |
|---|---|---|
| 1 | 10.212 | 10 |
| 2 | 12.000 | 38 |
| 3 | 12.400 | 96 |

Example 5—Effectiveness of Gel Breaker

To test the effectiveness of a routine gel breaker, a pair of samples were prepared, one containing the gel breaker potassium persulfate (2 lbs per thousand gallon), and the other without the gel breaker. The samples were prepared in the following manner: to a glass jar with 120 ml deionized water was added 0.3 grams of guar gum. The guar was quickly stirred to be distributed in the water without visible particles. The system was allowed to remain at ambient temperature for 30 minutes in order to hydrate. The fluid was then adjusted to a pH value of 12.5 by adding NaOH solutions (10% for initial adjustment, 0.5% for fine adjustment). 45 grams of 40/70 Unimin white sand and 0.9 grams of borax solution (20% in ethylene glycol) was added to the fluid, and the fluid was manually mixed for 5 minutes.

The samples were placed in an oven with a temperature between 60-80° C. It was found that the sample with the gel breaker was completely broken at 18 minutes, and the sand fell to the bottom of the jar. Meanwhile, the sample without the gel breaker only settled about 20%. This test suggests that an oxidizer gel breaker is still effective for the guar-boron-proppant matrix.

While the present invention has been described and illustrated by reference to particular embodiments and examples, those of ordinary skill in the art will appreciate that the invention lends itself to variations not necessarily illustrated herein.

The invention claimed is:

1. A proppant-gel matrix composition comprising:
    a hydrated gelling agent having a pH in the range of 12.0 to 14.0, the hydrated gelling agent comprising guar gum or a derivative thereof;
    a proppant comprising sand; and
    a borate crosslinking agent,
    wherein the proppant is crosslinked with the hydrated gelling agent through the crosslinking agent, and wherein the proppant-gel matrix composition has a settling rate of less than 50% at 24 hours.

2. The composition of claim 1 wherein the hydrated gelling agent comprises a gelling agent comprising guar gum or a derivative thereof is selected from the group consisting of guar gum, hydroxypropyl guar, hydroxyethyl guar, carboxymethyl guar, carboxymethyl hydroxypropyl guar, carboxymethylhydroxyethyl guar, and combinations thereof.

3. The composition of claim 1 wherein the proppant comprising sand is selected from the group consisting of raw sand, phenolic-coated sand, polyurethane-coated sand, polyamide-coated sand, polyester-coated sand, small molecule additive-coated sand, and combinations thereof.

4. The composition of claim 1 wherein the borate crosslinking agent is selected from the group consisting of borax, boric acid, probertite, ulexite, nobleite, gowerite, frolovite, colemanite, meyerhofferite, inyoite, priceite, tertschite, ginorite, pinnoite, paternoite, kurnakovite, inderite, preobrazhenskite, hydroboracite, inderborite, kaliborite, veatchite, trialkoxy boron ester, and combinations thereof.

5. The composition of claim 2 wherein the gelling agent is present in an amount in the range of from 0.01 weight percent to 5 weight percent, based on the total weight of aqueous fluid in the proppant-gel matrix.

6. The composition of claim 1 wherein the proppant comprising sand is present in an amount in the range of from 2 weight percent to 60 weight percent, based on the total weight of the proppant-gel matrix.

7. The composition of claim 1 wherein the proppant comprising sand is present in an amount in the range of from 5 weight percent to 50 weight percent, based on the total weight of the proppant-gel matrix.

8. The composition of claim 1 wherein the borate crosslinking agent is present in an amount in the range of from 0.003 weight percent to 5 weight percent, based on the total weight of aqueous fluid in the proppant-gel matrix.

9. The composition of claim 1 wherein the borate crosslinking agent is present in an amount in the range of from 0.003 weight percent to 2 weight percent, based on the total weight of aqueous fluid in the proppant-gel matrix.

10. The composition of claim 1 wherein the hydrated gelling agent is made to have a pH in the range of 12.0 to 14.0 by adding a basic compound selected from the group consisting of sodium hydroxide, potassium hydroxide, lithium hydroxide, cesium hydroxide, rubidium hydroxide, ammonium hydroxide, magnesium hydroxide, calcium hydroxide, barium hydroxide, sodium carbonate, sodium bicarbonate, potassium carbonate, potassium bicarbonate, rubidium carbonate, rubidium bicarbonate, cesium carbonate, cesium bicarbonate, potassium phosphate, sodium phosphate, cesium phosphate, lithium phosphate, and combinations of any two or more thereof.

11. The composition of claim 1 wherein the proppant comprising sand comprises sand grains with a measurement in the range of from 3 to 500 mesh.

12. The composition of claim 1 wherein the proppant comprising sand comprises sand grains with a measurement in the range of from 10 to 400 mesh.

13. A fracturing fluid comprising the proppant-gel matrix composition of claim 1.

14. A proppant-gel matrix composition, comprising:
a hydrated gelling agent having a pH in the range of 12.1 to 14.0, the hydrated gelling agent comprises guar;
a proppant comprising sand; and
a borate crosslinking agent,
wherein the proppant is crosslinked with the hydrated gelling agent through the crosslinking agent, and wherein the proppant-gel matrix composition has a settling rate of less than 40% at 48 hours.

15. The composition of claim 14, wherein:
the proppant comprising sand is selected from the group consisting of raw sand, phenolic-coated sand, polyurethane-coated sand, polyamide-coated sand, polyester-coated sand, small molecule additive-coated sand, and combinations thereof.

16. The composition of claim 14, wherein the borate crosslinking agent is selected from the group consisting of borax, boric acid, probertite, ulexite, nobleite, gowerite, frolovite, colemanite, meyerhofferite, inyoite, priceite, tertschite, ginorite, pinnoite, paternoite, kurnakovite, inderite, preobrazhenskite, hydroboracite, inderborite, kaliborite, veatchite, trialkoxy boron ester, and combinations thereof.

17. The composition of claim 14, wherein:
the proppant comprising sand is present in an amount in the range of from 5 weight percent to 50 weight percent, based on the total weight of the proppant-gel matrix; and
the borate crosslinking agent is present in an amount in the range of from 0.003 weight percent to 2 weight percent, based on the total weight of aqueous fluid in the proppant-gel matrix.

18. The composition of claim 14, wherein the proppant comprising sand comprises sand grains with a measurement in the range of from 20 to 200 mesh.

19. The composition of claim 14, wherein the borate crosslinking agent is selected from the group consisting of borax, boric acid, and a combination thereof.

* * * * *